United States Patent
Yang et al.

(10) Patent No.: US 10,158,749 B2
(45) Date of Patent: Dec. 18, 2018

(54) METHOD BY WHICH PORTABLE DEVICE DISPLAYS INFORMATION THROUGH WEARABLE DEVICE, AND DEVICE THEREFOR

(71) Applicant: SAMSUNG ELECTRONICS CO., LTD., Suwon-si (KR)

(72) Inventors: Fan Yang, Beijing (CN); Xianghua Liu, Beijing (CN); Yongjian Ma, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/030,141

(22) PCT Filed: Oct. 17, 2014

(86) PCT No.: PCT/KR2014/009786
§ 371 (c)(1),
(2) Date: Apr. 18, 2016

(87) PCT Pub. No.: WO2015/057013
PCT Pub. Date: Apr. 23, 2015

(65) Prior Publication Data
US 2016/0277557 A1    Sep. 22, 2016

(30) Foreign Application Priority Data
Oct. 17, 2013   (CN) .......................... 2013 1 0486544

(51) Int. Cl.
*H04M 1/725*   (2006.01)
*H04W 4/18*    (2009.01)
(Continued)

(52) U.S. Cl.
CPC ......... *H04M 1/7253* (2013.01); *H04M 1/575* (2013.01); *H04W 4/18* (2013.01);
(Continued)

(58) Field of Classification Search
CPC .............. H04M 1/7253; H04M 1/575; H04M 2250/74; H04M 3/42; H04W 4/008; H04W 76/023; H04W 4/18
See application file for complete search history.

(56) References Cited

U.S. PATENT DOCUMENTS

| | | | |
|---|---|---|---|
| 8,781,453 B1 * | 7/2014 | Belford | H04M 3/42042 455/412.1 |
| 2002/0068600 A1 * | 6/2002 | Chihara | H04B 1/385 455/557 |

(Continued)

FOREIGN PATENT DOCUMENTS

| | | |
|---|---|---|
| CN | 101115255 A | 1/2008 |
| CN | 102656808 A | 9/2012 |

(Continued)

OTHER PUBLICATIONS

Communication dated Sep. 19, 2016 issued by the State Intellectual Property Office of P.R. China in counterpart Chinese Patent Application No. 201310486544.9.

(Continued)

*Primary Examiner* — Kamran Afshar
*Assistant Examiner* — Minjung Kim
(74) *Attorney, Agent, or Firm* — Sughrue Mion, PLLC

(57) ABSTRACT

Provided are a controller configured to detect a call connection state of the mobile apparatus, and obtain relevant information related to another party of a call connection as the call connection state is detected, and a communication interface configured to transmit the relevant information to a wearable apparatus.

21 Claims, 19 Drawing Sheets

(51) Int. Cl.
  *H04M 1/57* (2006.01)
  *H04W 4/80* (2018.01)
  *H04W 76/14* (2018.01)
(52) U.S. Cl.
  CPC ............. *H04W 4/80* (2018.02); *H04W 76/14* (2018.02); *H04M 2250/74* (2013.01)

(56) References Cited

U.S. PATENT DOCUMENTS

| | | | | |
|---|---|---|---|---|
| 2006/0045374 | A1* | 3/2006 | Kim | G06K 9/00469 382/255 |
| 2009/0286514 | A1* | 11/2009 | Lichorowic | H04M 3/4938 455/412.2 |
| 2010/0232586 | A1* | 9/2010 | McCullough | H04M 3/5183 379/142.15 |
| 2011/0130130 | A1 | 6/2011 | Du | |
| 2011/0143769 | A1* | 6/2011 | Jones | G06F 1/1624 455/456.1 |
| 2011/0207447 | A1* | 8/2011 | Bhow | H04M 1/2535 455/417 |
| 2012/0076285 | A1* | 3/2012 | White | H04M 15/06 379/142.14 |
| 2013/0040610 | A1* | 2/2013 | Migicovsky | H04L 1/1867 455/412.2 |
| 2013/0262298 | A1 | 10/2013 | Morley | |
| 2014/0106677 | A1* | 4/2014 | Altman | H04B 1/3827 455/41.2 |
| 2014/0113607 | A1 | 4/2014 | Ikeda | |
| 2014/0273975 | A1* | 9/2014 | Barat | G06F 15/17312 455/412.2 |
| 2015/0022438 | A1* | 1/2015 | Hong | H04M 1/7253 345/156 |

FOREIGN PATENT DOCUMENTS

| | | | |
|---|---|---|---|
| KR | 10-2009-0002188 | A | 1/2009 |
| KR | 10-2010-0011129 | A | 2/2010 |
| KR | 10-2011-0080347 | A | 7/2011 |
| KR | 10-2012-0102115 | A | 9/2012 |
| KR | 10-1188978 | B1 | 10/2012 |
| WO | 2012/172970 | A1 | 12/2012 |

OTHER PUBLICATIONS

Search Report dated Jan. 19, 2015, issued by the International Searching Authority in counterpart international Patent Application No. PCT/KR2014/009786 (PCT/ISA/210).

Written Opinion dated Jan. 19, 2015, issued by the International Searching Authority in counterpart international Patent Application No. PCT/KR2014/009786 (PCT/ISA/237).

Communication dated May 12, 2017 by the State Intellectual Property Office of P.R. China in counterpart Chinese Patent Application No. 201310486544.9.

Communication issued May 17, 2017 by the European Patent Office in counterpart European Patent Application No. 14853349.0.

Communication dated Dec. 4, 2017, issued by the State Intellectual Property Office of People's Republic of China in counterpart Chinese Patent Application No. 201310486544.9.

Communication dated Jun. 1, 2018, issued by the State Intellectual Property Office of People's Republic of China in counterpart Chinese Patent Application No. 201310486544.9.

Communication dated Sep. 13, 2018, issued by the State Intellectual Property Office of P.R. China in counterpart Chinese Application No. 201310486544.9.

* cited by examiner

METHOD BY WHICH PORTABLE DEVICE DISPLAYS INFORMATION THROUGH WEARABLE DEVICE, AND DEVICE THEREFOR

TECHNICAL FIELD

The present disclosure relates to a method for a mobile apparatus to display relevant information via a wearable apparatus, the mobile apparatus, and the wearable apparatus.

BACKGROUND ART

With developments in communication technologies, mobile apparatuses have become essential electronic devices in our daily lives. Meanwhile, when a user makes a phone call by using a mobile apparatus, the mobile apparatus is held at the user's ears, and thus, a screen of the mobile apparatus may not display information. If the user wants to see some information via the screen of the mobile apparatus while making a phone call, the user has to use a hands-free function, an earphone, etc., which causes inconvenience.

Thus, there is a need to provide a method and apparatus for receiving useful information via a wearable apparatus, while a user makes a phone call.

DETAILED DESCRIPTION OF THE INVENTION

Technical Problem

If a user wants to see relevant information related to the caller, through the screen of the portable device, the user needs to equip hands-free device, such as earphones.

Technical Solution

A mobile apparatus according to an embodiment of the present invention includes a controller configured to detect a call connection state of the mobile apparatus, and obtain relevant information related to another party of a call connection as the call connection state is detected; and a communication interface configured to transmit the relevant information to a wearable apparatus.

Advantageous Effects of the Invention

In the embodiment of the present invention, a mobile apparatus provides user convenience by controlling relevant information related to another party of a call connection to be displayed on the wearable apparatus.

BEST MODE

Figure 1:
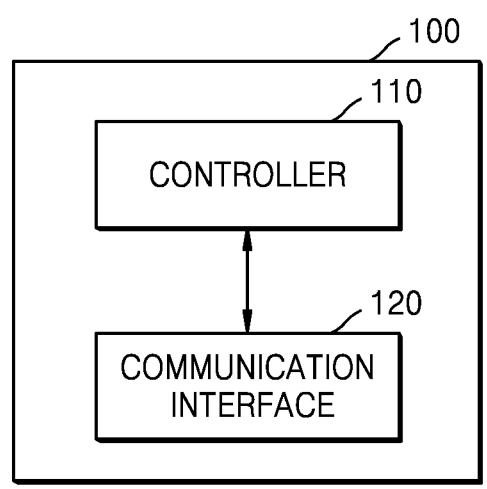
FIG. 1 is a block diagram illustrating an example structure of a mobile apparatus.

According to an aspect of an embodiment, a mobile apparatus includes: a controller configured to detect a call connection state of the mobile apparatus, and obtain relevant information related to another party of a call connection as the call connection state is detected; and a communication interface configured to transmit the relevant information to a wearable apparatus.

The relevant information may include at least one of memo information, schedule information, address book information, image information, and information uploaded on a social network service (SNS) that are related to the other party of the call connection, and information obtained during the call connection.

The controller may set a display parameter with respect to the relevant information, and the communication interface may transmit the display parameter to the wearable apparatus. The display parameter may include at least one of whether to display the relevant information on the wearable apparatus or the mobile apparatus, types of the relevant information, an order in which the relevant information is displayed, and the number of pieces of the relevant information.

The controller may generate a user interface and store the relevant information based on a user input via the user interface.

The controller may obtain a voice command from a user of the mobile apparatus as the call connection is detected, and the relevant information may include information based on the voice command.

The controller may obtain information which had been displayed on the mobile apparatus before the call was connected, as the call connection is detected.

The communication interface may transmit, to the wearable apparatus, first relevant information from among the relevant information and receives, from the wearable apparatus, a request to transmit second relevant information that is based on the first relevant information.

The controller, according to a user input received from the mobile apparatus, may control the communication interface to establish a communication link between the mobile apparatus and the wearable apparatus so that the call is connected to the wearable apparatus, and may control the relevant information displayed on the mobile apparatus.

The controller may obtain the relevant information related to the other party of the call connection from an external server.

According to an aspect of another embodiment, a wearable apparatus includes: a communication interface configured to receive relevant information related to another party of a call connection, as a call connection state is detected via a mobile apparatus; a display configured to display the relevant information; a user input unit configured to receive a user input from a user of the wearable apparatus; and a controller configured to change the relevant information based on the user input.

The relevant information may include information obtained from an external server as the call connection state is detected via the mobile apparatus.

The communication interface may receive a display parameter with respect to the relevant information, and the display may display the relevant information based on the display parameter.

The communication interface may receive first relevant information from among the relevant information, and the controller may request a transmission of second relevant information that is based on the first relevant information, based on the user input.

According to an aspect of another embodiment, a method of transmitting relevant information via a mobile apparatus includes: detecting a call connection state of the mobile apparatus; obtaining relevant information related to another party of a call connection, as the call connection state is detected; and transmitting the relevant information to a wearable apparatus.

The transmitting of the relevant information to the wearable apparatus may include: setting a display parameter with respect to the relevant information, and transmitting the display parameter to the wearable apparatus.

The transmitting of the relevant information to the wearable apparatus may include: generating a user interface, and storing the relevant information based on a user input via the user interface.

The transmitting of the relevant information to the wearable apparatus may include transmitting first relevant information from among the relevant information to the wearable apparatus, and the method may further include receiving a request to transmit second relevant information that is based on the first relevant information, from the wearable apparatus.

According to an aspect of another embodiment, a method of displaying relevant information via a wearable apparatus includes: receiving relevant information related to another party of a call connection, as a call connection state is detected via a mobile apparatus; displaying the relevant information; receiving a user input from a user of the wearable apparatus; and changing the relevant information based on the user input.

The receiving of the relevant information related to the other party of the call connection may include receiving first relevant information from among the relevant information, and the changing of the relevant information based on the user input may include requesting a transmission of second relevant information that is based on the first relevant information, based on the user input.

MODE OF THE INVENTION

Terminologies used in this specification will be briefly described and the present inventive concept will be described in detail.

Most of the terms used herein are general terms that have been widely used in the technical art to which the present inventive concept pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present inventive concept.

In the present specification, it should be understood that the terms, such as "including" or "having," are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Also, the terms, such as "unit" or "module," should be understood as a unit that processes at least one function or operation and that may be embodied in a hardware manner, a software manner, or a combination of the hardware manner and the software manner.

Throughout the specification, a "partner" may denote an external device which may communicate with a mobile apparatus, or a user of the external device. Also, the partner may be identified based on at least one piece of identification information (for example, a name, a telephone number, etc. of the partner) stored in the mobile apparatus.

Throughout the specification, a "touch input" may denote a gesture of a user on a touch screen using a finger or a touch device (for example, an electronic pen) for controlling a wearable apparatus. Also, a "motion input" may denote a motion that a user performs on a wearable apparatus to control the wearable apparatus.

Hereinafter, the present inventive concept will be described more fully with reference to the accompanying drawings, in which exemplary embodiments of the inventive concept are shown. The inventive concept may, however, be embodied in many different forms and should not be construed as being limited to the embodiments set forth herein; rather these embodiments are provided so that this disclosure will be thorough and complete, and will fully convey the inventive concept to one of ordinary skill in the art. In the drawings, like reference numerals denote like elements. Also, while describing the present inventive concept, detailed descriptions about related well known functions or configurations that may blur the points of the present inventive concept are omitted. As used herein, the term "and/or" includes any and all combinations of one or more of the associated listed items. Expressions such as "at least one of," when preceding a list of elements, modify the entire list of elements and do not modify the individual elements of the list.

In the specification, a wearable apparatus may denote an apparatus that is wearable to a human body of a user and may exchange data with a mobile apparatus. The wearable apparatus may be formed as various types, and may include a network communication function.

Hereinafter, the present inventive concept will be described in detail with reference to the accompanying drawings.

FIG. 1 is a block diagram illustrating an example structure of a mobile apparatus 100.

As illustrated in FIG. 1, the mobile apparatus 100 may include at least one of a controller 110 and a communication interface 120.

The controller 110 may control a general operation of the mobile apparatus 100.

According to an embodiment, the controller 110 may detect a call connection state of the mobile apparatus 100. Also, the controller 110 may detect a distance between the mobile apparatus 100 and a user of the mobile apparatus 100.

For example, the controller 110 may receive a control signal indicating that a voice call is connected from the communication interface 120. Also, the controller 110 may receive distance information between the mobile apparatus 100 and the user of the mobile apparatus 100, from a proximity sensor provided in the mobile apparatus 100.

Also, when the controller 110 detects that a call is connected, the controller 110 may obtain relevant information related to a partner of the call connection.

Here, the relevant information may include memo information, schedule information, image information, information uploaded by the partner on a social network service (SNS), for example, Facebook, Weibo, etc., web chatting information, advertisement information, information obtained during the call connection, etc., which are pre-set in the mobile apparatus as being related to the partner of the call connection.

The memo information may be information that is set by a user through a memo application, and the schedule information may be information that is set by a user through a schedule management application.

In some embodiments, the controller 110 may obtain the relevant information stored in the mobile apparatus 100. Also, the controller 110 may obtain the relevant information from an external server.

For example, the controller 110 may obtain SNS account information of the partner of the call connection. Also, based on the obtained SNS account information, the controller 110 may obtain, from an external server, information that is uploaded by the partner, as the relevant information.

If there is no relevant information that is pre-set, the controller 110 may automatically obtain address book information corresponding to the partner of the call connection.

Also, the controller 110 may automatically obtain an email, a text message, chatting information, etc. including identification information (for example, a name, a telephone number, etc.) of the partner of the call connection.

Also, in some embodiments, the controller 110 may obtain a voice command of a user during the call connection. Here, the voice command may include a name, an address, a telephone number, weather, etc.

For example, the controller 110 may identify voice information of the user of the mobile apparatus 100. Also, the controller 110 may determine whether the identified voice information includes a voice command. Also, when the voice command is obtained, the controller 110 may obtain information corresponding to the voice command as the relevant information.

Also, when the controller 110 detects the call connection, the controller 110 may obtain information that had been displayed on a screen of the mobile apparatus 100 before the call was connected, as the relevant information.

In some embodiments, the controller 110 may package the obtained relevant information into various types.

In some embodiments, the controller 110 may set at least one piece of relevant information related to a partner of the call connection.

Here, the partner may denote an external device that may communicate (for example, perform a voice call) with the mobile apparatus 100 or a user of the external device. The controller 110 may identify the partner based on at least one piece of identification information (for example, a name, a telephone number, etc. of the partner) which is stored in the mobile apparatus 100.

Also, the controller 110 may generate a user interface. The controller 110 may set certain information as the at least one piece of relevant information related to the partner, based on a user input via the user interface.

For example, the controller 110 may generate the user interface in an execution window of a memo application. Also, the controller 110 may set the entire or part of information displayed in the execution window of the memo application as the at least one piece of relevant information related to the partner, in response to the user input via the user interface. A method of setting at least one piece of relevant information related to the partner in the mobile apparatus will be described later with reference to FIGS. 3 and 4.

Also, the controller 110 may store the relevant information that is set in a memory.

In some embodiments, the controller 110 may set a display parameter with respect to the relevant information. Here, the display parameter may include whether to display the relevant information on a wearable apparatus or the mobile apparatus 100, types of the relevant information, an order in which the relevant information is displayed, the number of pieces of the relevant information, etc.

For example, types of the relevant information may include information, such as a text format (for example, UTF-8, UTF-16, etc.), an image format (for example, JPG, GIF, etc.), etc.

Also, the controller 110 may generate a configuration window for setting the display parameter. The configuration window and a method of setting the display parameter with respect to the relevant information will be described later with reference to FIG. 5.

Meanwhile, the controller 110 may establish a communication link between the mobile apparatus 100 and the wearable apparatus.

For example, the controller 110 may establish the communication link between the mobile apparatus 100 and the wearable apparatus, based on a user input received during the call connection.

When the communication link is established, the controller 110 may stop transmitting the relevant information to the wearable apparatus. Instead, the controller 110 may control the mobile apparatus 100 to display the relevant information. Via the communication link, the user may communicate with the partner via the wearable apparatus and may receive the relevant information related to the partner of the call connection via the mobile apparatus 100.

The communication interface 120 may perform communication between the mobile apparatus 100 and the wearable apparatus or between the mobile apparatus 100 and an external device.

In some embodiments, the communication interface 120 may transmit a control signal to the controller 110, when the call connection with the partner is detected.

Also, the communication interface 120 may obtain the relevant information related to the partner of the call connection from an external server.

Also, the communication interface 120 may transmit the relevant information to the wearable apparatus. Also, the communication interface 120 may transmit the display parameter with respect to the relevant information to the wearable apparatus.

Meanwhile, the communication interface 120 may transmit the relevant information and the display parameter to the wearable apparatus, according to a synchronous transmission method or an asynchronous transmission method. For example, the communication interface 120 may push the relevant information to the wearable apparatus.

Also, the communication interface 120 may transmit first relevant information from among the relevant information to the wearable apparatus. In this case, the communication interface 120 may transmit second relevant information, when a request of transmitting the second relevant information is received.

For example, according to the order in which the relevant information is displayed, the communication interface 120 may transmit the first relevant information and the second relevant information. Also, when the request of transmitting the second relevant information includes a request of specific information, the communication interface 120 may transmit the specific information.

The communication interface 120 may perform communication via Bluetooth communication, Bluetooth low energy communication, near field communication, WLAN (Wi-Fi) communication, Zigbee communication, infrared data association (IrDA) communication, Wi-Fi direct (WFD) communication, ultra wideband (UWB) communication, Ant+ communication, etc., but it is not limited thereto.

Also, the communication interface 120 may exchange a wireless signal with at least one of a base station in a mobile communication network, an external terminal, and a server. Here, the wireless signal may include data of various formats.

Meanwhile, the mobile apparatus 100 of FIG. 1 may be included in a mobile apparatus 100*a* of FIG. 17, which will be described later, or may be realized as a separate device. For example, the controller 110 of the mobile apparatus 100 may be included in a controller 1710 of the mobile apparatus 100*a* of FIG. 17, and the communication interface 120 of the mobile apparatus 100 may be included in a communication interface 1740 of the mobile apparatus 100*a* of FIG. 17.

Figure 2:
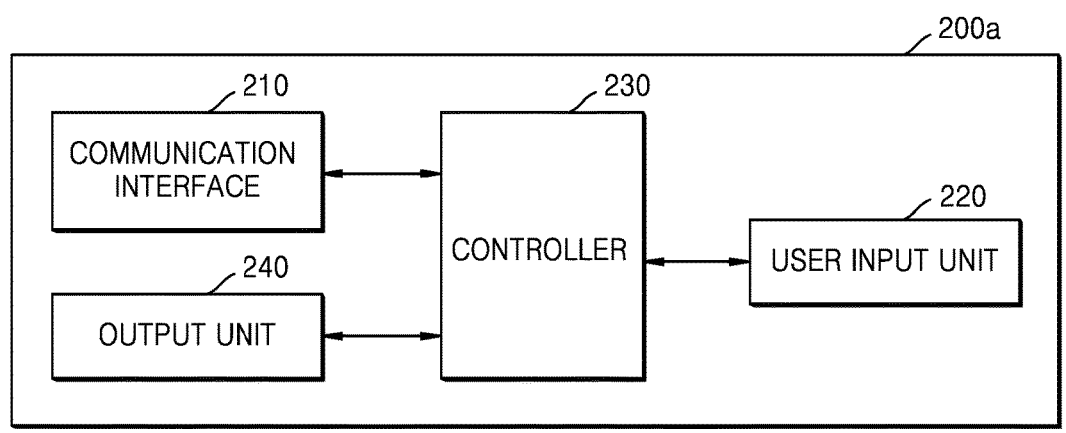
FIG. 2 is a block diagram illustrating an example structure of a wearable apparatus.

FIG. 2 is a block diagram illustrating an example structure of a wearable apparatus 200*a*. Here, the wearable apparatus 200*a* may include a device that is wearable to a human body. The wearable apparatus 200*a* may be implemented as various forms. For example, the wearable apparatus 200*a* may be implemented as a smart watch, a smart band, a head mounted display (HMD) device, clothing, etc., but it is not limited thereto.

Referring to FIG. 2, the wearable apparatus 200*a* may include at least one of a communication interface 210, a controller 230, an output unit 240, and a user input unit 220.

In some embodiments, the communication interface 210 may perform communication between the mobile apparatus 100 and other external devices. For example, the communication interface 210 may perform communication with the mobile apparatus 100 via near field communication networks (for example, Bluetooth communication, near field communication, etc.).

In some embodiments, the communication interface 210 may receive relevant information related to a partner of a call connection in the mobile apparatus 100, from the mobile apparatus 100 or an external device.

Also, the communication interface 210 may receive a display parameter with respect to the relevant information from the mobile apparatus 100 or an external device.

As described above, the relevant information may include schedule information, memo information, image information, text message information, and information uploaded on an SNS, etc. that are related to the partner of the call connection in the mobile apparatus 100.

Also, the relevant information may include information that had been displayed on a screen of the mobile apparatus 100 before the call was connected in the mobile apparatus 100.

Also, the relevant information may include information corresponding to a voice command obtained during the call connection from a user of the mobile apparatus 100. However, the relevant information is not limited thereto.

The display parameter may include whether to display the relevant information on the mobile apparatus 100 or the wearable apparatus 200*a*, types of the relevant information, an order in which the relevant information is displayed, and the number of pieces of the displayed relevant information, etc.

In some embodiments, the user input unit 220 may receive a user input. For example, the user input unit 220 may receive, from a user, a motion input that corresponds to shaking the wearable apparatus 200*a*. Also, the user input unit 220 may receive a touch input that corresponds to touching a screen on which the relevant information is displayed.

Meanwhile, the user input unit 220 may include an acceleration sensor, a tilt sensor, a gyro sensor, a 2-axis magnetic sensor, etc., in order to receive a motion input or a touch input.

In some embodiments, the controller 230 may control a general operation of the wearable apparatus 200*a*. For example, the controller 230 may generally control the communication interface 210, the user input unit 220, and the output unit 240.

The controller 230 may control the output unit 240 to display the relevant information based on the received display parameter with respect to the relevant information.

For example, the controller 230 may control the output unit 240 to display the relevant information according to the order in which the relevant information is displayed.

Also, the controller 230 may change the displayed relevant information, based on the received motion input.

For example, the controller 230 may receive a plurality of pieces of relevant information related to the partner of the call connection in the mobile apparatus 100. The controller 230 may display first relevant information from among the plurality of pieces of relevant information. Also, the controller 230 may change the displayed relevant information to second relevant information, as the motion input of the user is received.

Also, the controller 230 may receive only the first relevant information from among the plurality of pieces of relevant information, from the mobile apparatus 100. In this case, the controller 230 may request the mobile apparatus 100 to transmit second relevant information.

Also, the controller 230 may receive a touch input on a screen on which the first relevant information from among the plurality of pieces of relevant information is displayed. In this case, the controller 230 may request the mobile apparatus 100 to transmit specific information corresponding to the touch input.

For example, the user may touch a certain word (for example, a name, a telephone number, etc.) included in the displayed first relevant information. In this case, the controller 230 may request the mobile apparatus 100 to transmit information related to the word.

In some embodiments, the output unit 240 may receive a control signal from the controller 230. Also, the output unit 240 may display the relevant information based on the received control signal.

Meanwhile, the wearable apparatus 200a may include a memory to store the relevant information received from the mobile apparatus 100.

Also, the wearable apparatus 200a may include a network communication function, and may include an earphone and a microphone (for example, a Bluetooth earphone and a Bluetooth microphone, etc.).

In some embodiments, when a communication link is established between the mobile apparatus 100 and the wearable apparatus 200a, the controller 230 may automatically change the earphone and the microphone included in the wearable apparatus 200a to an available state.

Also, the controller 230 may output audio data received via the communication link via the earphone, and transmit audio data input via the microphone of the wearable apparatus 200a to the mobile apparatus 100. The user may make a phone call with the partner of the call connection, via the wearable apparatus 200a.

Also, during the call connection, the communication interface 210 may stop receiving the relevant information.

Thereafter, when the communication link between the mobile apparatus 100 and the wearable apparatus 200a is dismissed, the controller 230 may automatically change the earphone and the microphone to an unavailable state. Also, the communication interface 210 may re-start receiving the relevant information.

In addition, although it is not illustrated in FIG. 2, in some embodiments, the wearable apparatus 200a may further include a universal serial bus (USB) port, to which a USB connector may be connected, various external input ports, such as a headset, a mouse, etc., to which various external terminals may be connected, speaker, various sensors, etc.

Figure 3:
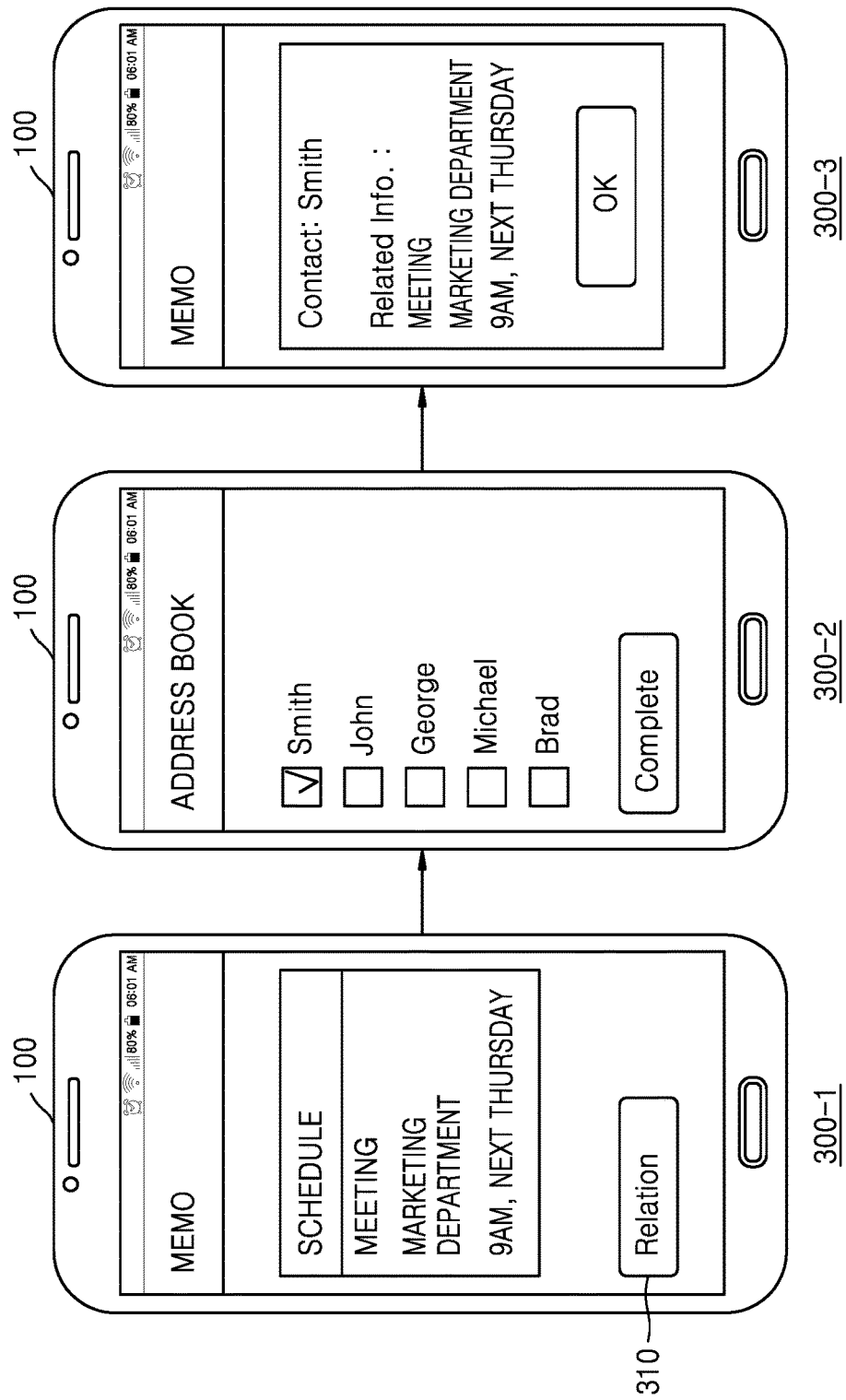
FIG. 3 illustrates an example mobile apparatus setting relevant information.

FIG. 3 illustrates an example mobile apparatus 100 setting the relevant information.

As illustrated in FIG. 3, the mobile apparatus 100 may generate a user interface. Also, the mobile apparatus 100 may set some of application information as the relevant information, based on a user input via the user interface.

In some embodiments, the mobile apparatus 100 may generate a user interface (a "contact" button) 310 in an execution window of a memo application (S300-1). The mobile apparatus 100 may receive a user input via the user interface 310.

Also, the mobile apparatus 100 may obtain the entire or part of information of the memo application.

Also, the mobile apparatus 100 may display a partner list including identification information of a user of a partner device which may communicate with the mobile apparatus 100 (S300-2).

For example, the mobile apparatus 100 may obtain the partner list from an address book application, etc.

The mobile apparatus 100 may set the relevant information related to Smith, by mapping the obtained memo application information and the identification information, Smith, selected from the partner list.

Also, the mobile apparatus 100 may display the set relevant information (S300-3). The set relevant information may be stored in the mobile apparatus 100 or an external server.

Thereafter, when the mobile apparatus 100 connects a call with the partner Smith, the mobile apparatus 100 may transmit memo information related to the identification information Smith, to the wearable apparatus 200a.

Figure 4:
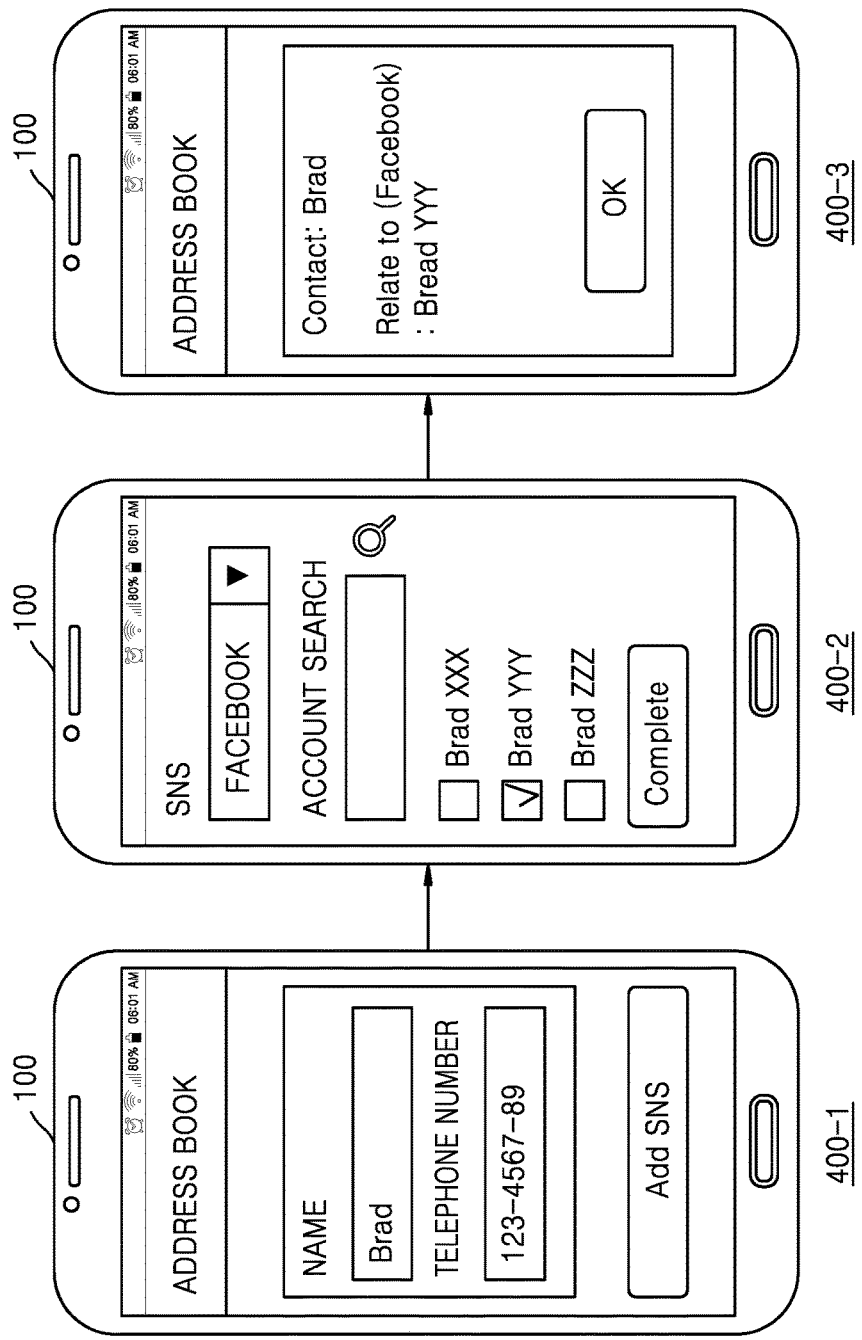
FIG. 4 illustrates an example mobile apparatus setting relevant information.

FIG. 4 illustrates an example mobile apparatus 100 setting the relevant information.

As illustrated in FIG. 4, the mobile apparatus 100 may generate a user interface in an execution window of an address book application on the mobile apparatus 100 (S400-1).

Also, the mobile apparatus 100 may receive a user input via the user interface. Also, the mobile apparatus 100 may display a window for setting an SNS account of a partner, based on the user input (S400-2).

For example, based on the user input, the mobile apparatus 100 may set a Facebook account corresponding to the partner's identification information (e.g. "Smith") that is stored in the address book application. The account information may be stored in the mobile apparatus 100 (S400-3).

Thereafter, when the mobile apparatus 100 connects a call with the partner Smith, the mobile apparatus 100 may transmit information uploaded on the Facebook by the partner to the wearable apparatus 200a as the relevant information, based on the Facebook account information corresponding to Smith.

Figure 5A:
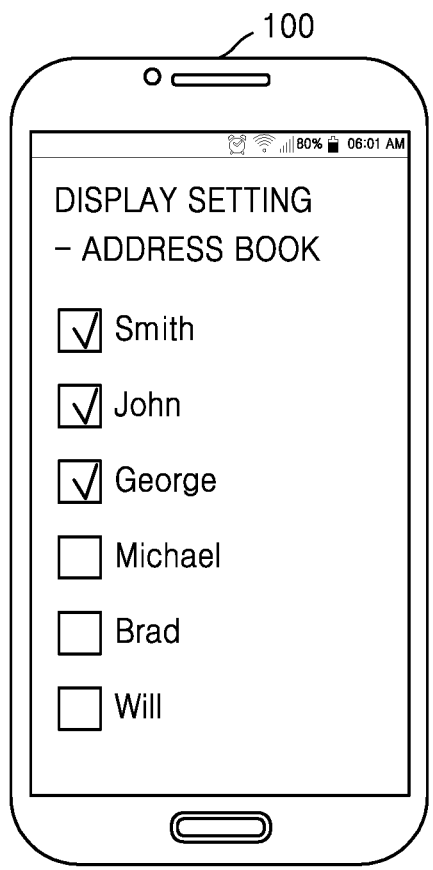
FIGS. 5A through 5C illustrate an example mobile apparatus setting a display parameter with respect to relevant information.
Figure 5B:
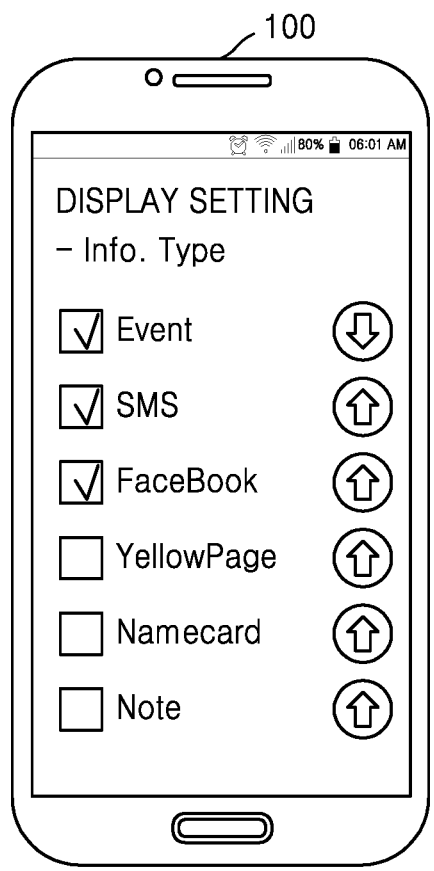
Figure 5C:
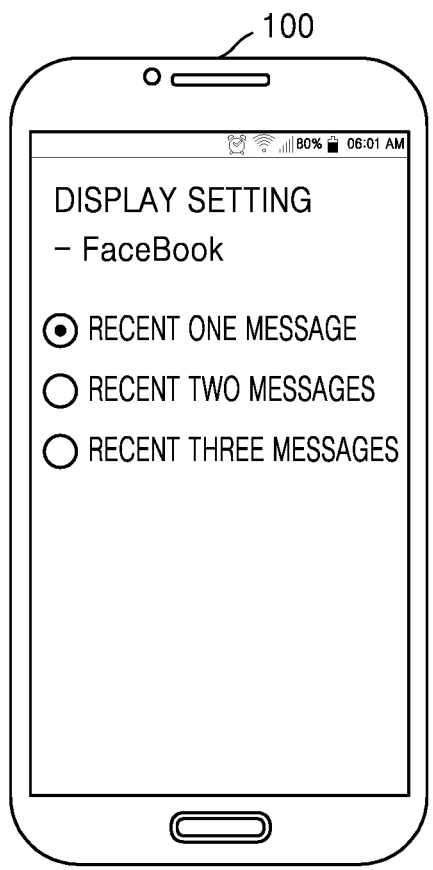

FIGS. 5A through 5C illustrate examples in which the mobile apparatus 100 sets a display parameter with respect to the relevant information.

Referring to FIGS. 5A through 5C, the mobile apparatus 100 may generate a configuration window for setting the display parameter. The configuration window may include a plurality of pages for setting the display parameter. Here, the page may indicate data which may be displayed on one screen of the mobile apparatus 100. Each of FIGS. 5A through 5C may be one page.

As illustrated in FIG. 5A, the mobile apparatus 100 may select a partner, for whom the relevant information is displayed, based on a user input received in the configuration window.

For example, the mobile apparatus 100 may display a partner list including identification information (for example, Smith, John, George, etc.) of users of partner devices which may communicate with the mobile apparatus 100.

Also, the mobile apparatus 100 may select at least one piece of identification information of the partner, Smith, based on the user input received in the configuration window.

Thereafter, when a call is connected with the selected partner, Smith, the mobile apparatus 100 may transmit the relevant information to the wearable apparatus 200a. If the call is connected with John, who is not selected, the mobile apparatus 100 may not transmit the relevant information to the wearable apparatus 200a.

Also, as illustrated in FIG. 5B, the mobile apparatus 100 may select types of the relevant information that is displayed on the mobile apparatus 100 or the wearable apparatus 200a, based on the user input received via the configuration window.

Also, the mobile apparatus 100 may change the order of display of the relevant information, based on the user input received via the configuration window.

Also, as illustrated in FIG. 5C, the mobile apparatus 100 may select the number of pieces of relevant information that is displayed on the mobile apparatus 100 or the wearable apparatus 200a, based on the user input received via the configuration window. However, it is not limited thereto.

Figure 6:
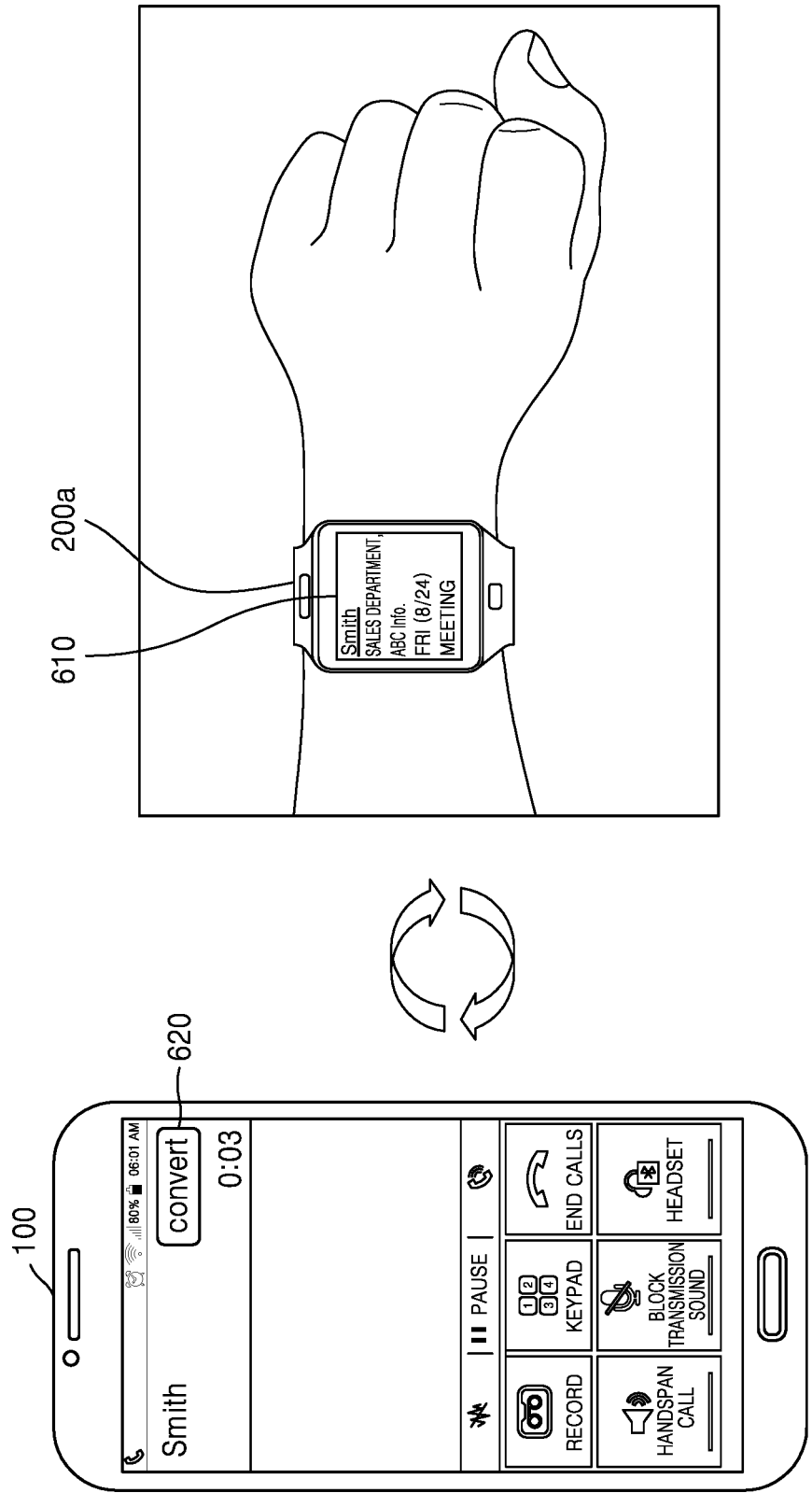
FIG. 6 illustrates an example in which a wearable apparatus displays relevant information.

FIG. 6 illustrates an example in which the wearable apparatus 200a displays the relevant information.

Referring to FIG. 6, as the call connection in the mobile apparatus 100 is detected, the mobile apparatus 100 may obtain the relevant information related to the partner of the call connection, e.g. Smith, from the mobile apparatus 100 or an external server.

Also, the mobile apparatus 100 may transmit the obtained relevant information to the wearable apparatus 200a.

The wearable apparatus 200a may display schedule information 610 related to the partner, e.g. Smith, while the user makes a phone call with Smith via the mobile apparatus 100.

In some embodiments, the wearable apparatus 200a may change the displayed relevant information, in response to a user input shaking the wearable apparatus 200a.

For example, the wearable apparatus 200a may change the schedule information 610 to information uploaded by the partner, e.g. Smith, on the SNS and display the uploaded information, according to a user input.

Also, the mobile apparatus 100 may generate a link button 620 for establishing a communication link between the mobile apparatus 100 and the wearable apparatus 200a.

When the mobile apparatus 100 receives a user input with respect to the link button 620, the mobile apparatus 100 may establish the communication link between the mobile apparatus 100 and the wearable apparatus 200a.

When the communication link is established, the mobile apparatus 100 may stop transmitting the relevant information to the wearable apparatus 200a and may display the relevant information related to Smith on the mobile apparatus 100.

Figure 7:
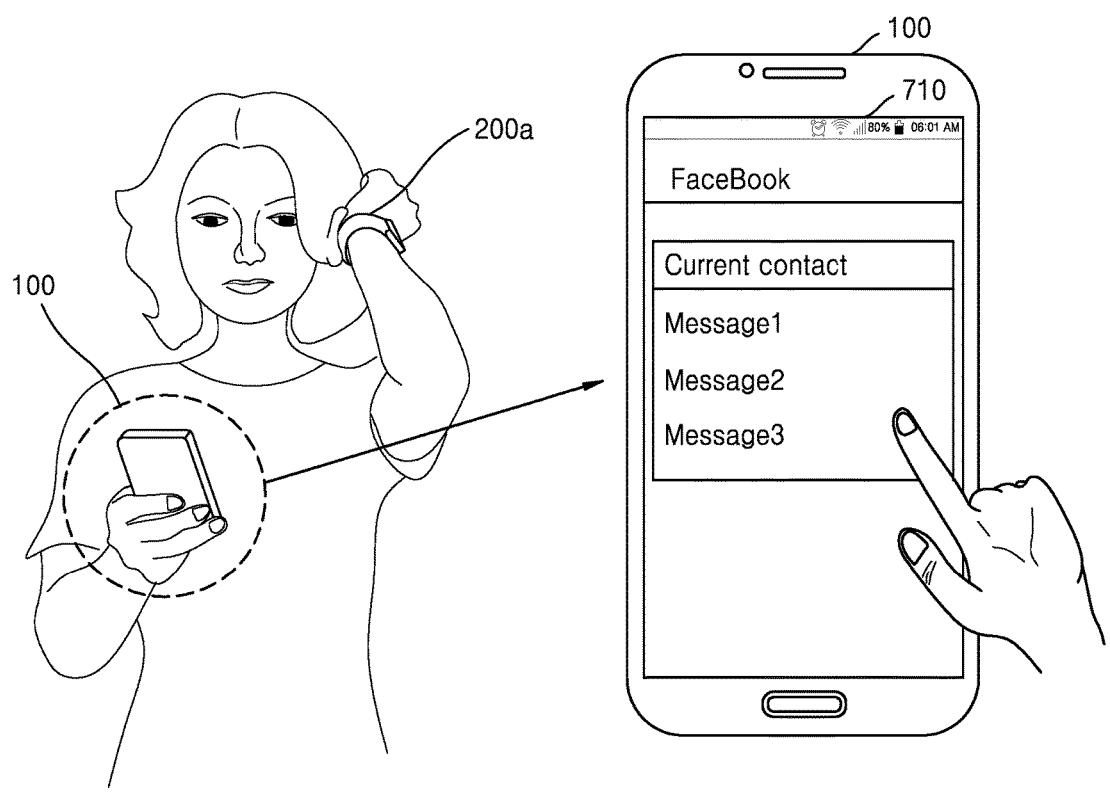
FIG. 7 illustrates an example in which a communication link is established between a mobile apparatus and a wearable apparatus.

FIG. 7 illustrates an example in which a communication link is established between the mobile apparatus 100 and the wearable apparatus 200a.

As illustrated in FIG. 7, the communication link may be established between the mobile apparatus 100 and the wearable apparatus 200a.

For example, when the communication link is established, the wearable apparatus 200a may perform a voice call with the partner of the call connection in the mobile apparatus 100, via the established communication link. Also, when the communication link is established, the wearable apparatus 200a may activate a speaker included in the wearable apparatus 200a.

Also, the mobile apparatus 100 may display the relevant information related to the partner. For example, the mobile apparatus 100 may display information 710 that is uploaded on the SNS by the partner.

Figure 8:
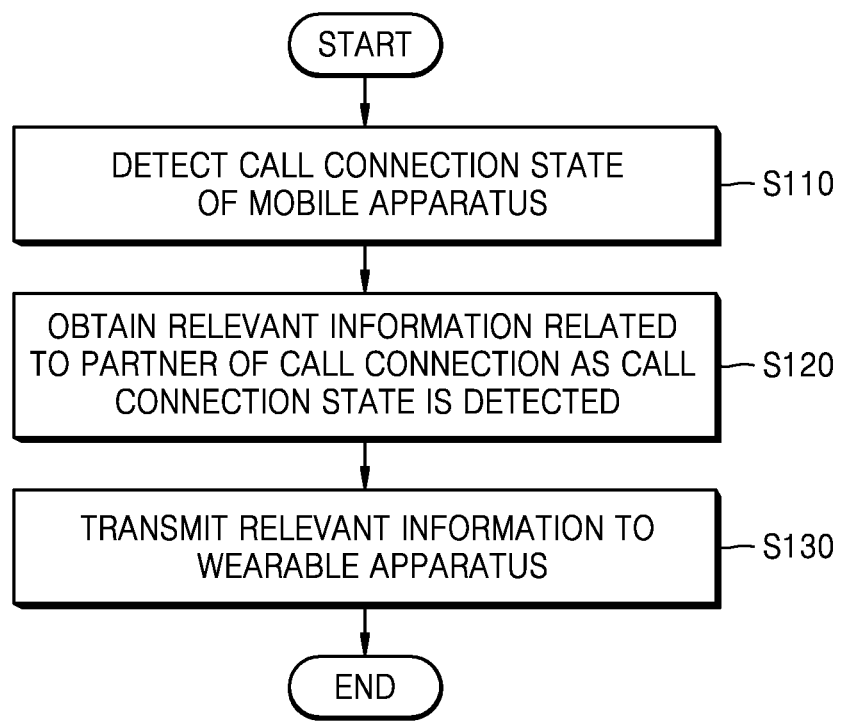
FIG. 8 is a flowchart illustrating an example method of transmitting relevant information to a wearable apparatus, via a mobile apparatus.

FIG. 8 is a flowchart illustrating an example method of transmitting the relevant information to the wearable apparatus 200a via the mobile apparatus 100.

Referring to FIG. 8, the mobile apparatus 100 may detect a call connection state of the mobile apparatus 100 in operation S110. Also, the mobile apparatus 100 may detect a distance between the mobile apparatus 100 and a user.

In operation S120, as the call connection is detected, the mobile apparatus 100 may obtain the relevant information related to a partner of the call connection.

Here, the relevant information may include memo information, schedule information, image information, information uploaded by the partner on a social network service (SNS), for example, Facebook, Weibo, etc., web chatting information, advertisement information, information obtained during the call connection, etc., which are pre-set in the mobile apparatus 100 as being related to the partner of the call connection.

For example, when the mobile apparatus 100 detects the call connection, the mobile apparatus 100 may obtain SNS account information of the partner of the call connection. Also, based on the obtained SNS account, the mobile apparatus 100 may obtain information uploaded by the partner from an external server.

If there is no pre-set relevant information, the mobile apparatus 100 may automatically obtain address book information of the partner of the call connection.

Also, the mobile apparatus 100 may automatically obtain an email, text message data, etc. including a name, a telephone number, etc. of the partner of the call connection. However, it is not limited thereto.

Also, during the call connection, the mobile apparatus 100 may obtain a voice command of the user. For example, the mobile apparatus 100 may identify voice information of the user of the mobile apparatus 100. Also, the mobile apparatus 100 may determine whether the identified voice information includes the voice command.

Here, the voice command may include a name, an address, a telephone number, etc. of a specific partner.

When the voice command is obtained, the mobile apparatus 100 may obtain information corresponding to the voice command as the relevant information.

Also, when the call connection is detected, the mobile apparatus 100 may obtain information that had been displayed on a screen of the mobile apparatus 100 before the call was connected, as the relevant information.

Also, the mobile apparatus 100 may package the obtained relevant information according to various formats.

Meanwhile, it is described above that the mobile apparatus 100 obtains the relevant information related to a partner of the call connection, when a call is connected. However, it is not limited thereto. For example, the mobile apparatus 100 may obtain the relevant information related to the partner of the call connection, when the mobile apparatus 100 detects that a call is connected and that a distance between the mobile apparatus 100 and the user is within a predetermined range.

The mobile apparatus 100 may transmit the obtained relevant information to the wearable apparatus 200a in operation S130.

Also, the mobile apparatus 100 may transmit a display parameter with respect to the relevant information to the wearable apparatus 200a.

The display parameter with respect to the relevant information may include whether to display the relevant information on the wearable apparatus 200a or the mobile apparatus 100, types of the relevant information, an order of display of the relevant information, the number of pieces of the relevant information, etc.

In some embodiments, the mobile apparatus 100 may transmit the relevant information and the display parameter to the wearable apparatus 200a, according to a synchronous transmission method or an asynchronous transmission method. For example, the mobile apparatus 100 may push the relevant information and the display parameter to the wearable apparatus 200a.

Meanwhile, the obtained relevant information may include a plurality of pieces of information. In some embodiments, the mobile apparatus 100 may transmit first relevant information from among the obtained relevant information to the wearable apparatus 200a. In this case, the mobile apparatus 100 may receive a request of transmitting second relevant information from the wearable apparatus 200a.

Based on the received request of transmitting the relevant information, the mobile apparatus 100 may transmit the second relevant information to the wearable apparatus 200a.

For example, the mobile apparatus 100 may transmit the second relevant information after the first relevant information, according to the order of display of the relevant information.

Also, when the received request of transmitting the relevant information requires specific information, the mobile apparatus 100 may transmit the specific information.

In some embodiments, the mobile apparatus 100 may establish a communication link between the mobile apparatus 100 and the wearable apparatus 200a.

When the communication link is established, the mobile apparatus 100 may transmit sound data and image data received from the partner of the call connection to the wearable apparatus 200a. Also, the mobile apparatus 100 may transmit the sound data and the image data received from the wearable apparatus 200a to a partner device.

Also, the mobile apparatus 100 may stop transmitting the relevant information to the wearable apparatus 200a and may display the relevant information on the mobile apparatus 100.

According to the present embodiment, the user may make a phone call with the partner via the wearable apparatus 200a, and may receive the relevant information related to the partner via the mobile apparatus 100.

Figure 9:
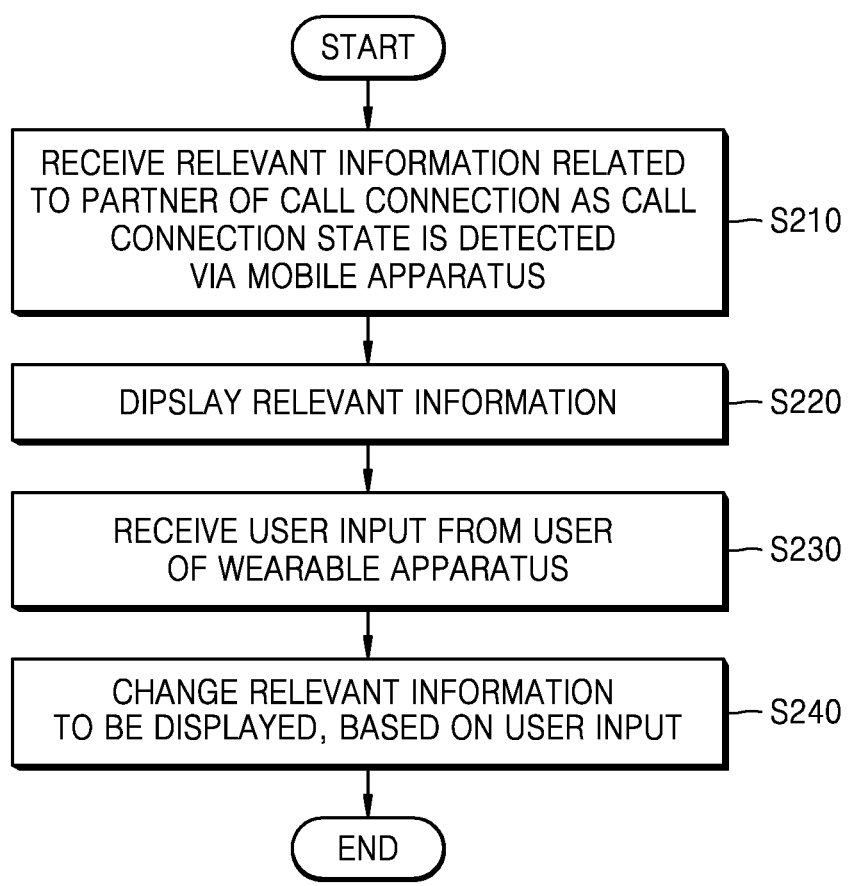
FIG. 9 is a flowchart illustrating an example method of displaying relevant information via a wearable apparatus.

FIG. 9 is a flowchart illustrating an example method of displaying the relevant information via the wearable apparatus 200a.

Referring to FIG. 9, in operation S210, the wearable apparatus 200a may receive the relevant information.

In some embodiments, the wearable apparatus 200a may receive the relevant information from the mobile apparatus 100 or an external server.

The relevant information may include memo information, schedule information, image information, information uploaded by the partner on a social network service (SNS), for example, Facebook, Weibo, etc., web chatting information, advertisement information, information obtained during the call connection, etc., which are pre-set in the mobile apparatus 100 as being related to the partner of the call connection.

Also, the relevant information may include information that had been displayed on a screen of the mobile apparatus 100 before the call was connected in the mobile apparatus 100.

Also, the relevant information may include information corresponding to a voice command obtained during the call connection from the user of the mobile apparatus 100.

In some embodiments, the wearable apparatus 200a may receive a display parameter with respect to the relevant information.

The display parameter with respect to the relevant information may include whether to display the relevant information on the wearable apparatus 200a, types of the relevant information, an order of display of the relevant information, the number of pieces of the relevant information, etc.

Also, the wearable apparatus 200a may store the received relevant information and display parameter with respect to the relevant information.

Meanwhile, the wearable apparatus 200a may communicate with the mobile apparatus 100 via near field wireless communication.

In operation S220, the wearable apparatus 200a may display the received relevant information. In some embodiments, the wearable apparatus 200a may display the received relevant information based on the received display parameter.

In operation S230, the wearable apparatus 200a may receive a user input.

In some embodiments, the wearable apparatus 200a may receive a user's motion input shaking the wearable apparatus 200a.

Also, the wearable apparatus 200a may receive a user input touching a screen on which the relevant information is displayed.

In operation S240, the wearable apparatus 200a may change the displayed relevant information based on the user input.

In some embodiments, based on the motion input of the user, the wearable apparatus 200a may change first relevant information to second relevant information according to the display parameter and may display the second relevant information.

For example, the wearable apparatus 200a may determine the second relevant information that is to be displayed after the first relevant information, according to the number of pieces of the relevant information and the order of display of the relevant information, which are set in the display parameter.

If the second relevant information is not received, the wearable apparatus 200a may request the mobile apparatus 100 to transmit the second relevant information.

Also, in some embodiments, the wearable apparatus 200a may receive a touch input of the user on the screen on which the first relevant information is displayed. Also, the wearable apparatus 200a may request the mobile apparatus 100 to transmit specific information that is related to the information displayed on the area on which the touch input is received.

For example, the wearable apparatus 200a may receive a user's touch input on an area on which a telephone number is displayed. In this case, the wearable apparatus 200a may request the mobile apparatus 100 to transmit specific information related to the telephone number.

The mobile apparatus 100 may transmit address book information, etc., corresponding to the telephone number to the wearable apparatus 200a.

As described above, the user of the mobile apparatus 100 and the wearable apparatus 200a may receive useful information via the wearable apparatus 200a, during the call connection in the mobile apparatus 100.

Figure 10:
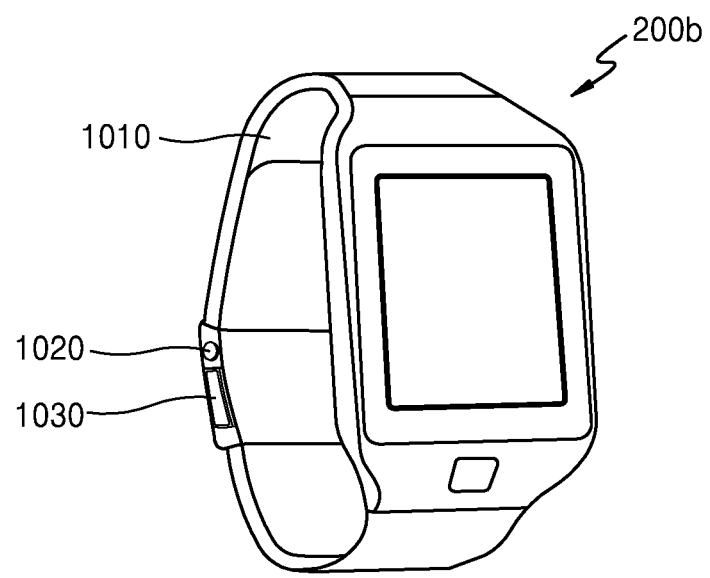
FIG. 10 illustrates an example feature of a wearable apparatus.

FIG. 10 illustrates an example feature of a wearable apparatus 200b.

The wearable apparatus 200b may include at least one of the communication interface 210, the controller 230, the output unit 240, the user input unit 220, at least one distance measurement sensor 1020 which may measure a distance between the mobile apparatus 100 and the wearable apparatus 200b, and a camera 1030. The distance measurement sensor may include at least one of a proximity sensor, an infrared sensor, a position sensor, an illuminance sensor, a magnetic sensor, and a gyro sensor, or a combination thereof.

In some embodiments, the distance measurement sensor 1020 and the camera 1030 may be arranged in a band 1010 of the wearable apparatus 200b.

For example, as illustrated in FIG. 10, the wearable apparatus 200b may a smart watch including a proximity sensor and the camera 1030 arranged in the band 1010.

The communication interface 210 of the wearable apparatus 200b may receive content from the mobile apparatus 100. For example, the content may include information displayed on some areas of a screen of the mobile apparatus 100.

In some embodiments, the camera 1030 may photograph the mobile apparatus 100. In this case, the controller 230 may obtain the content based on the photographed image.

The controller 230 may receive a distance value or a sensing value measured by at least one of the at least one distance measurement sensor and the camera 1030.

Also, the controller 230 may control the output unit 240 to display the content on the screen, based on the received distance value or sensing value. In some embodiments, the controller 230 may change a format of at least one piece of content and display the content.

Also, the communication interface 210 may receive hidden information from the mobile apparatus 100. Here, the hidden information may correspond to target information displayed on the mobile apparatus 100, and may be information displayed only on the wearable apparatus 200b if a certain condition is met.

The controller 230 may control the output unit 240 to display the hidden information on the screen based on tag information included in the hidden information.

Figure 11:
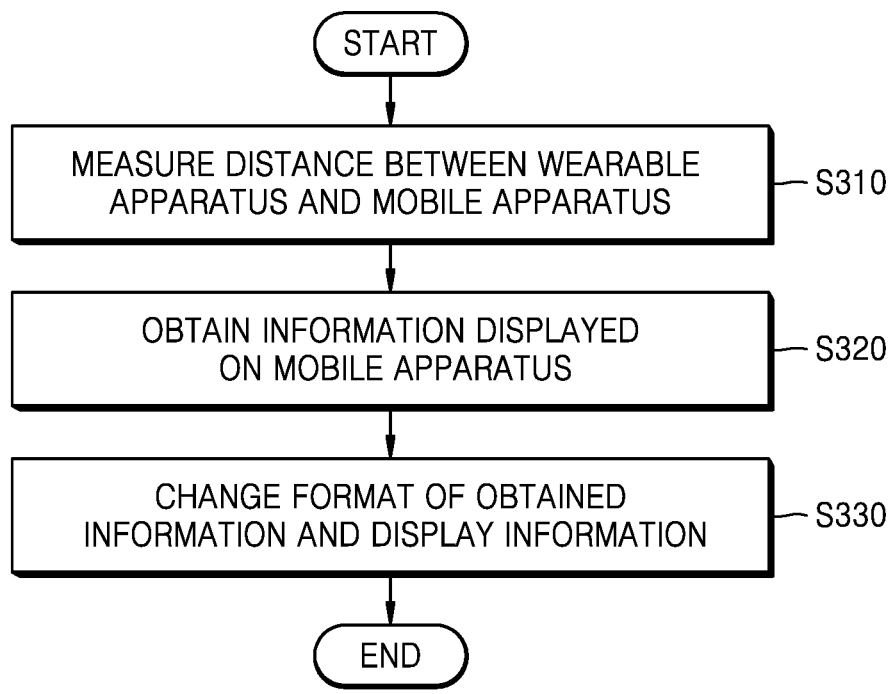
FIG. 11 is a flowchart illustrating an example method of displaying information via a wearable apparatus.

FIG. 11 is a flowchart illustrating an example method of displaying information via the wearable apparatus 200b.

Referring to FIG. 11, in operation S310, the wearable apparatus 200b may measure a distance between the wearable apparatus 200b and the mobile apparatus 100. For example, the wearable apparatus 200b may measure a distance from the mobile apparatus 100 by using a camera, a proximity sensor, etc.

When the measured distance is less than a critical distance, the wearable apparatus 200b may obtain some of information displayed on the screen of the mobile apparatus 100.

Figure 12:
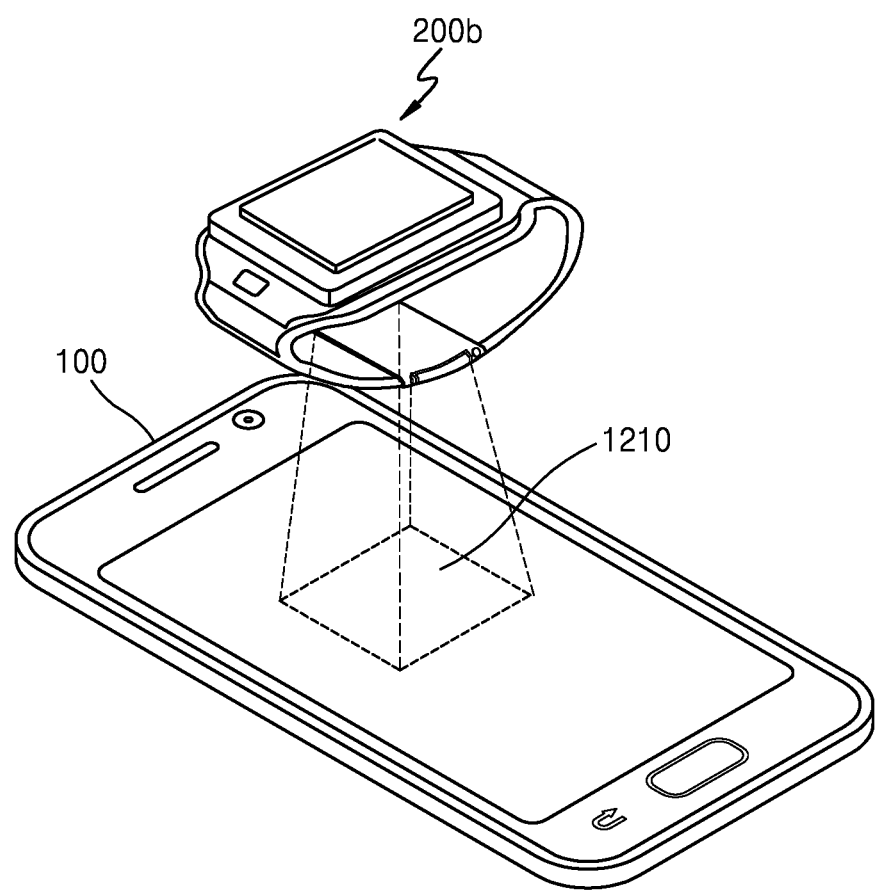

For example, as illustrated in FIG. 12, when the wearable apparatus 200b apart from the mobile apparatus 100 overlaps a portion 1210 of the screen of the mobile apparatus 100, the wearable apparatus 200b may obtain information displayed on the overlapped portion 1210 of the screen.

In some embodiments, the wearable apparatus 200b may request the mobile apparatus 100 to transmit the information displayed on the portion 1210 of the screen of the mobile apparatus 100.

In this case, the mobile apparatus 100 may obtain coordinate data of the portion 1210 of the screen of the mobile apparatus 100, by using the camera or the position sensor included in the mobile apparatus 100. Also, the mobile apparatus 100 may transmit the information displayed in the obtained coordinate data to the wearable apparatus 200b.

Also, the wearable apparatus 200b may photograph the mobile apparatus 100 by using the camera. For example, the wearable apparatus 200b may photograph the screen of the mobile apparatus 100 located in the critical distance. In this case, the wearable apparatus 200b may obtain the information displayed on the portion 1210 of the screen of the mobile apparatus 100, based on the photographed image.

In operation S330, the wearable apparatus 200b may change the format of the obtained information and display the information. Here, the format may include a color, a size, and a font of a text message, a size and a color of an image, a color of a background, etc.

In some embodiments, the wearable apparatus 200b may display a text message or an image included in the obtained information by changing the color of the text message or the image. Also, the wearable apparatus 200b may display the text message included in the relevant information by changing the size of the text message.

For example, as the distance between the wearable apparatus 200b and the mobile apparatus 100 increases, the wearable apparatus 200b may change the size of the text message or the image include in the relevant information.

Also, the wearable apparatus 200b may display a photographed image by changing the size of the photographed image. For example, the wearable apparatus 200b may display the photographed image by enlarging the size of the image, based on the distance between the wearable apparatus 200b and the mobile apparatus 100.

Figure 13:
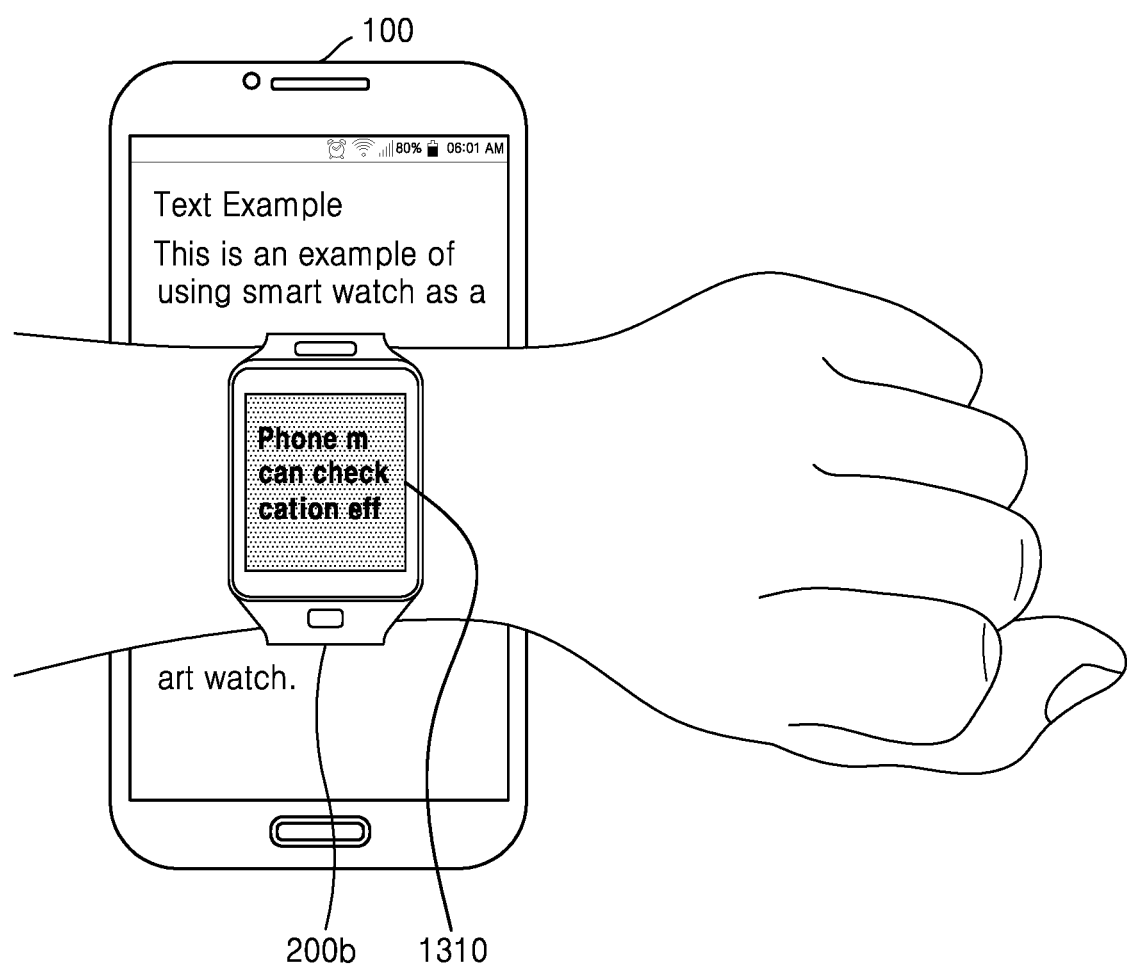
FIGS. 13 and 14 illustrate examples in which a wearable apparatus displays relevant information.
Figure 14:
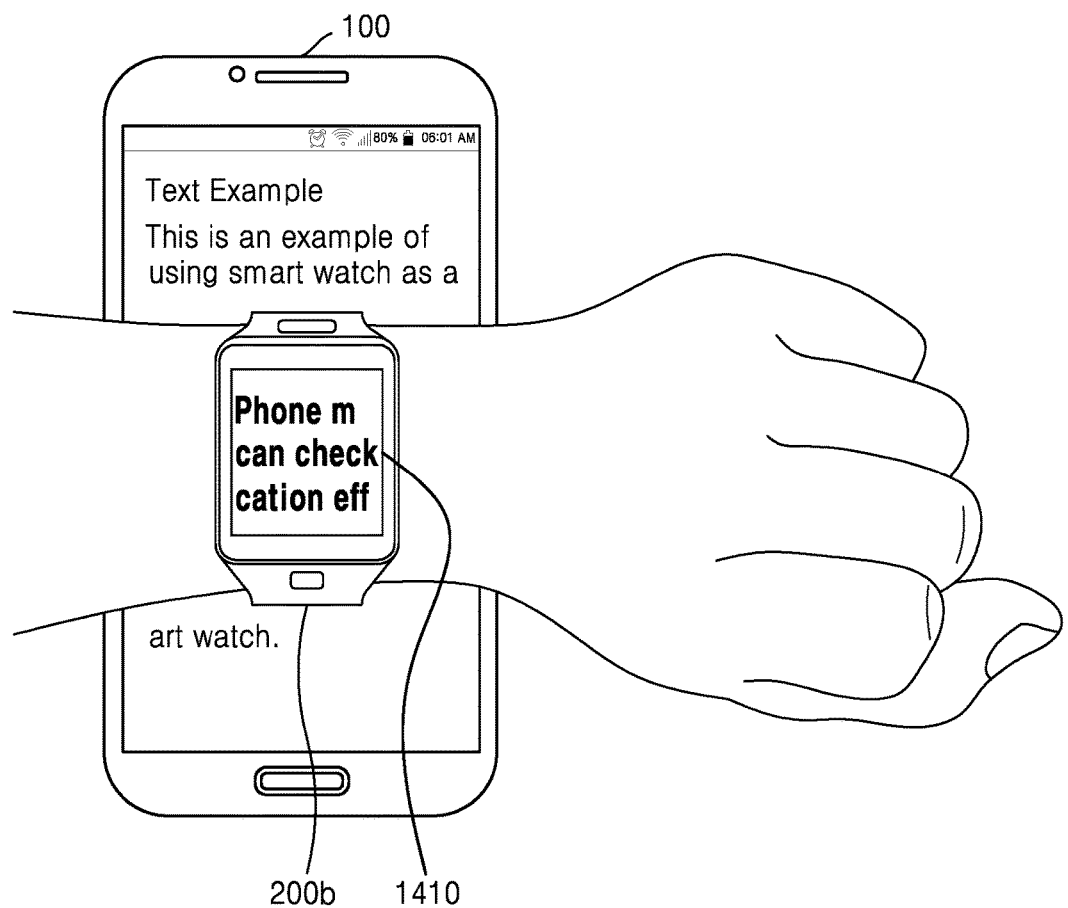

FIGS. 13 and 14 illustrate examples in which the wearable apparatus 200b displays information.

Referring to FIGS. 13 and 14, the wearable apparatus 200b may display information 1310 displayed on an area of the screen of the mobile apparatus 100 on the wearable apparatus 200b.

In some embodiments, as illustrated in FIG. 13, the wearable apparatus 200b may change the background color and the text message color of information 1310 and display the information 1310.

Also, as illustrated in FIG. 14, the wearable apparatus 200b may change the text message size of the information 1310 and display the information 1310.

Thus, the user may be effectively provided with some information displayed on the screen of the mobile apparatus 100, via the wearable apparatus 200b, even from a location apart from the mobile apparatus 100.

Figure 15:
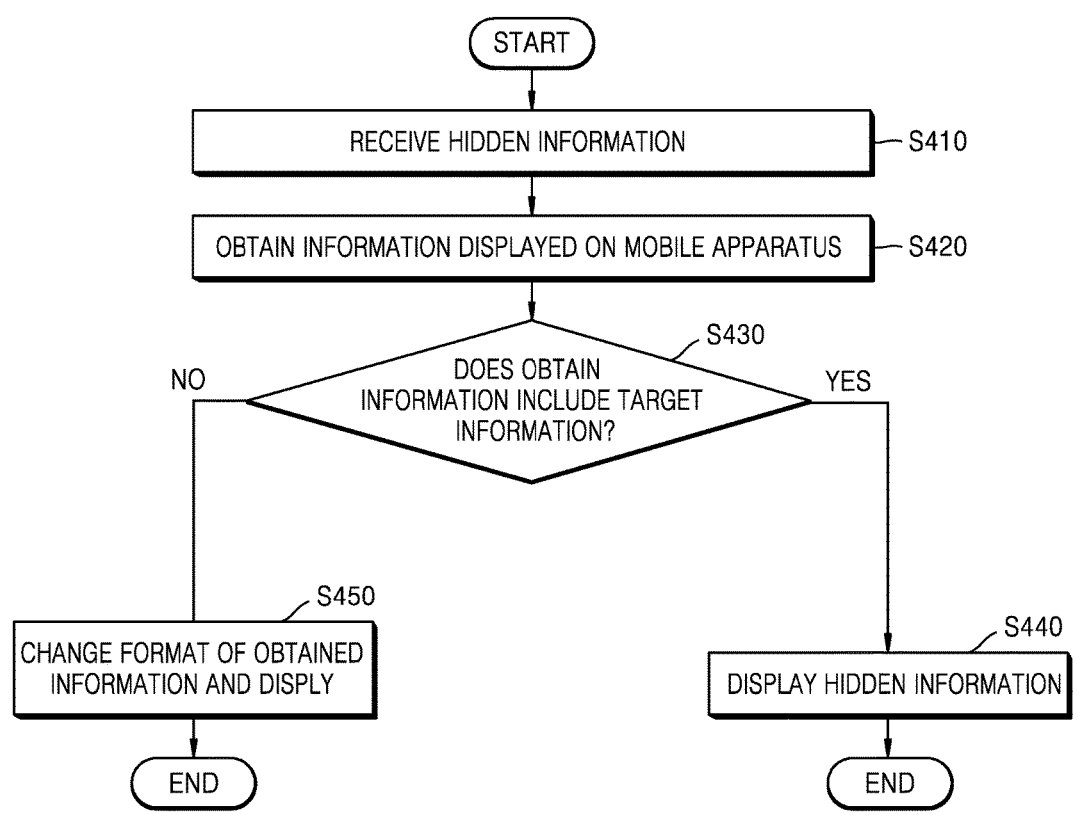
FIG. 15 is a flowchart illustrating an example method of displaying hidden information via a wearable apparatus.

FIG. 15 is a flowchart illustrating an example method of displaying hidden information via the wearable apparatus 200b.

Referring to FIG. 15, the wearable apparatus 200b may receive the hidden information from the mobile apparatus 100, in operation S410.

Here, the hidden information may correspond to target information which is displayed on the mobile apparatus 100, and may be information displayed only on the wearable apparatus 200b when a predetermined condition is satisfied. Also, the target information may correspond to the hidden information and may be information displayed on the mobile apparatus 100. For example, the hidden information may be a password, and the target information corresponding to the password may be a text message "**" displayed on the screen of the mobile apparatus 100**.

In some embodiments, the hidden information may include tag information. For example, the tag information may be the target information, coordinate data in which the target information is displayed on the mobile apparatus 100, or a share index shared by the target information and the hidden information.

Meanwhile, the target information and the hidden information may be information transmitted to the mobile apparatus 100 from an external device. For example, a text message received by the mobile apparatus 100 may include the target information and the hidden information.

In operation S420, when the wearable apparatus 200b apart from the mobile apparatus 100 overlaps the mobile apparatus 100, the wearable apparatus 200b may obtain information displayed on the mobile apparatus 100.

In some embodiments, the wearable apparatus 200b may obtain information displayed on the mobile apparatus 100 by using a camera included in the wearable apparatus 200b.

Also, the wearable apparatus 200b may receive the information displayed on the mobile apparatus 100 from the mobile apparatus 100.

In operation S430, the wearable apparatus 200b may determine whether the obtained information includes the target information. For example, the wearable apparatus 200b may determine whether the obtained information includes the target information, based on the tag information included in the hidden information.

In some embodiments, the wearable apparatus 200b may receive coordinate data of the screen of the mobile apparatus 100, at which the wearable apparatus 200b is located, from the mobile apparatus 100.

In this case, the wearable apparatus 200b may determine whether to display the hidden information, based on the received coordinate data and the tag information.

When the obtained information includes the target information, the wearable apparatus 200b may display the hidden information in operation S410. If the obtained information does not include the target information, the wearable apparatus 200b may change the format of the obtained information and display the information in operation S450.

As described above, the mobile apparatus 100 which is easily accessible by other users may display the target information, and the wearable apparatus 200b may display the hidden information when a predetermined condition is satisfied. Thus, the mobile apparatus 100 and the wearable apparatus 200b according to the embodiments may limit the access of other persons to certain information.

Figure 16:
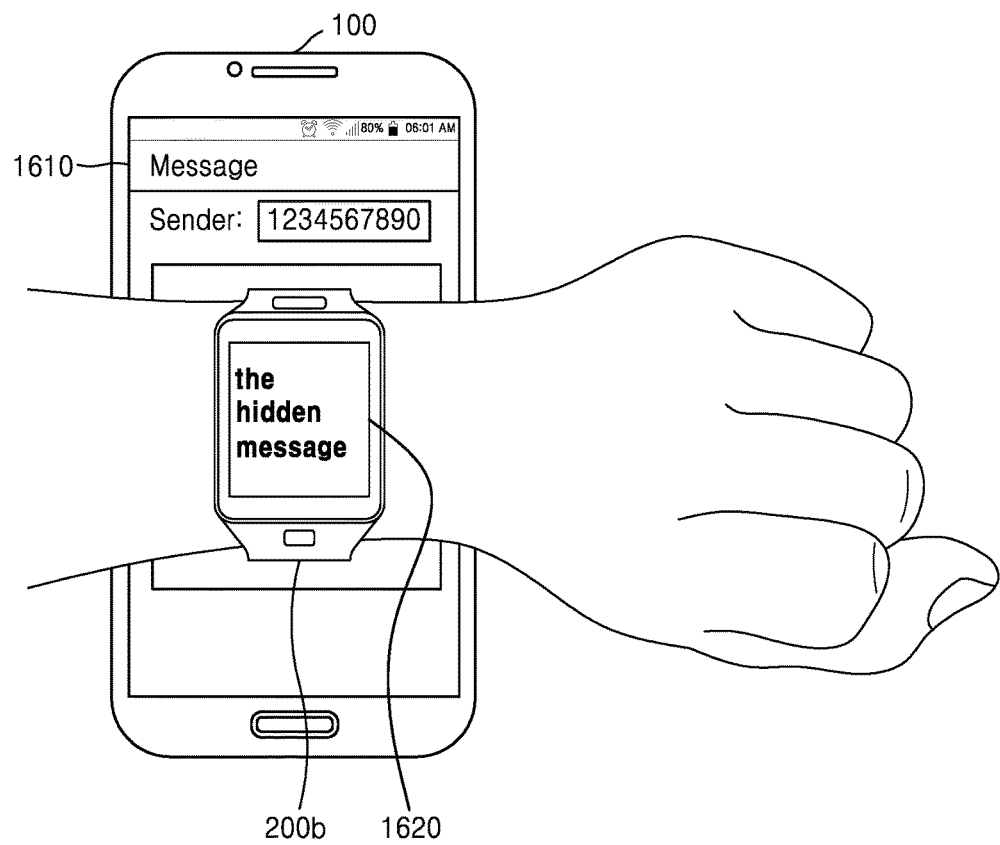
FIG. 16 illustrates an example in which a wearable apparatus displays hidden information.

FIG. 16 illustrates an example in which the wearable apparatus 200b displays hidden information.

As illustrated in FIG. 16, the mobile apparatus 100 may receive a text message 1610 including target information and hidden information, from an external device.

In some embodiments, when the wearable apparatus 200b apart from the mobile apparatus 100 overlaps a portion of the screen of the mobile apparatus 100, on which the target information is displayed, the wearable apparatus 200b may display hidden information 1620 corresponding to the target information.

Figure 17:
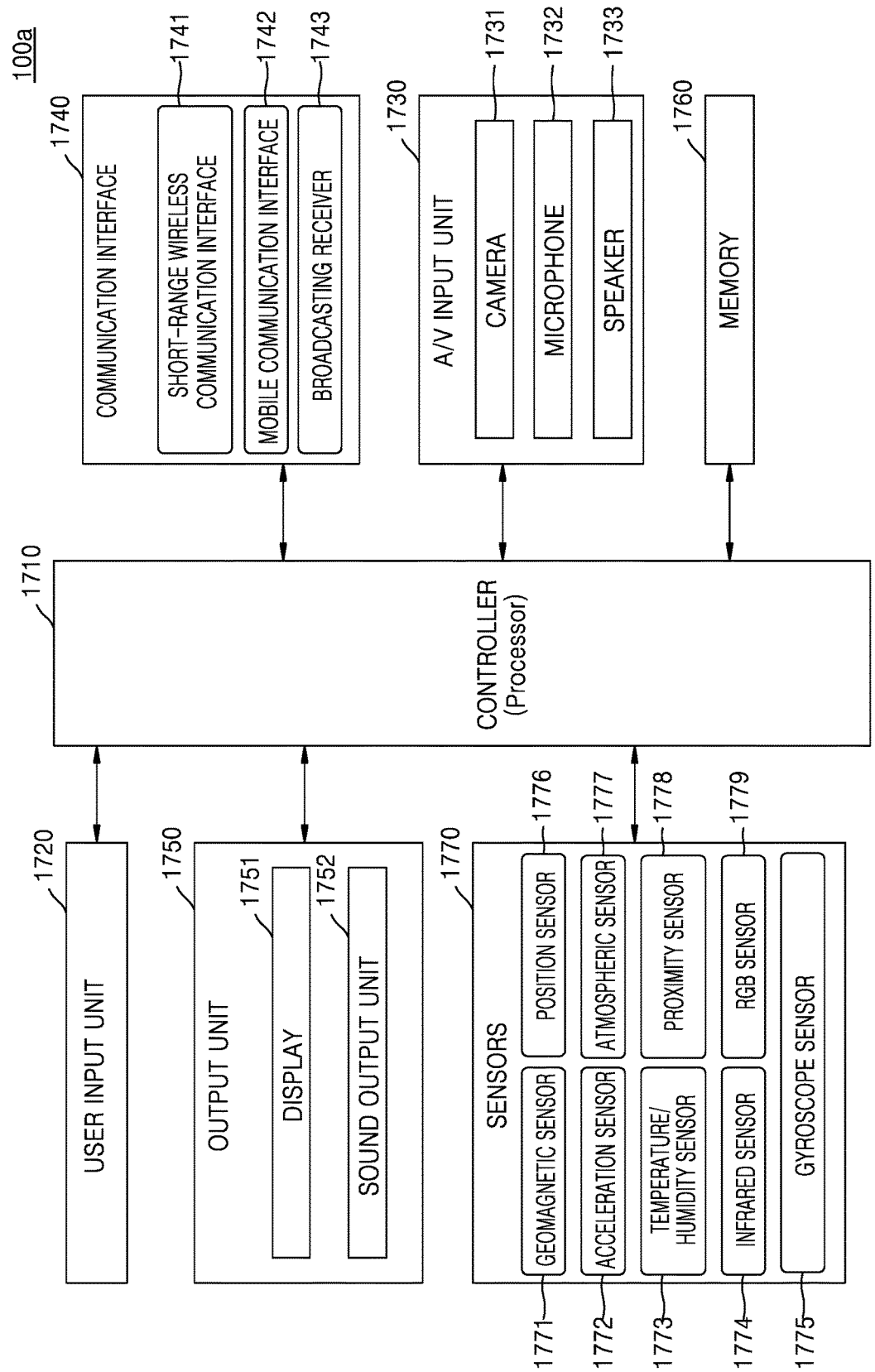
FIG. 17 is a block diagram illustrating an example structure of a mobile apparatus.

FIG. 17 is a block diagram illustrating an example structure of the mobile apparatus 100a.

As illustrated in FIG. 17, the mobile apparatus 100a according to the present embodiment may include a controller 1710, a user input unit 1720, an audio/video (A/V) input unit 1730, a communication interface 1740, an output unit 1750, and a memory 1760. However, not all of the components illustrated in FIG. 17 are essential components of the mobile apparatus 100a.

More or less components than the components illustrated in FIG. 17 may be used to realize the mobile apparatus 100a.

In some embodiments, the controller 1710 may control general operations of the mobile apparatus 100a.

For example, the controller 1710 may execute programs stored in the memory 1760 to generally control the user input unit 1720, the A/V input unit 1730, the output unit 1750, and the communication interface 1740. In detail, the controller 1710 may control communication (for example, voice communication and data communication). Also, the controller 1710 may include a decoder (not shown) which may decode audio and video streams.

Also, the controller 1710 may control the mobile apparatus 100a to decode the received audio and video streams and to output the decoded audio and video streams via the output unit 1750.

Also, the controller 1710 may control a display 1751 to display a user interface. For example, the user interface may include a keyboard on a screen.

Also, the controller 1710 may correspond to the controller 110 of FIG. 1.

For example, the controller 1710 may detect a call connection state. Also, the controller 1710 may detect a distance between the mobile apparatus 100a and a user of the mobile apparatus 100a.

Also, the controller 1710 may generate a user interface for setting relevant information. Also, the controller 1710 may store the set relevant information.

Also, the controller 1710 may establish a communication link between the mobile apparatus 100a and a wearable apparatus, based on a user input received during the call connection.

For example, via the established communication link, the controller 1710 may transmit sound data and video data received from a partner device of the call connection to the wearable apparatus and may transmit sound data and image data received from the wearable apparatus to the partner device.

Also, the controller 1710 may display the relevant information via the display 1751.

In some embodiments, the AV input unit 1730 is configured to input an audio signal or a video signal and may include a camera 1731, a microphone 1732, etc.

The camera 1731 may include a lens, an imaging sensor (for example, a charge coupled device (CCD) sensor, complementary metal oxide semiconductor (CMOS) sensor, etc.), an analog-to digital (A/D) converter, etc. The camera 1731 may obtain an image frame, such as a still image or a video, via the image sensor, in a video call mode or a photographing mode. The image captured by the image sensor may be processed by the controller 1710 or an additional image processor (not shown).

The image frame processed by the camera 1731 may be stored in the memory 1760 or transmitted to the outside via the communication interface 1740. Also, the camera 1731 may display the processed image frame via the display 1751. According to a structure of a terminal, two or more cameras 1731 may be included.

The microphone 1732 may receive an external sound signal and process the sound signal as electrical sound data. For example, the microphone 1732 may receive a sound signal from an external device or a speaker. The microphone 1732 may use various noise elimination algorithms for removing noise generated in the process of receiving the external sound signal.

In some embodiments, the output unit 1750 is configured to output audio data or video data and may include the display 1751, a microphone 1752, a speaker 1753, etc.

The display 1751 may display a user interface. For example, the display 1751 may display the user interface in an execution window of a memo application.

Also, the display 1751 may display the relevant information.

Meanwhile, when the display 1751 and a touch pad form a layer structure to realize a touch screen, the display 1751 may be used not only as an output device but also as an input device. The display 1751 may include at least one of a liquid crystal display, a thin film transistor-liquid crystal display, an organic light-emitting diode, a flexible display, a three dimensional (3D) display, and an electrophoretic display. Also, the mobile apparatus 100a may include two or more display 1751 according to a realization type of the mobile apparatus 100a.

Here, the two or more display 1751 may be arranged to face each other by using a hinge. Also, even when the display 1751 is formed as the touch screen, the mobile apparatus 100a may include several input keys. For example, the mobile apparatus 100a may include a power key for power on/off of the mobile apparatus 100a.

The speaker 1753 may reproduce audio data exchanged during a voice call, audio data including a message received during the voice call, and audio data included in an audio file stored in the memory 1760.

In some embodiments, the communication interface 1740 may include one or more components for enabling communication between the mobile apparatus 100a and a wearable apparatus or between the mobile apparatus 100a and external devices. For example, the communication interface 1740 may include a short-range wireless communication interface 1741, a mobile communication interface 1742, and a broadcasting receiver 1743.

The mobile apparatus 100a may communicate with the wearable apparatus via the short-range wireless communication interface 1741.

The short-range wireless communication interface 1741 may include a Bluetooth, a Bluetooth low energy (BLE), a near field, a WLAN (Wi-fi), a Zigbee, an infrared data association (IrDA), a Wi-Fi direct (WFD), a ultra wideband (UWB), an Ant+, etc., but it is not limited thereto.

The mobile communication interface 1742 exchanges wireless signals with at least one of a based station in a mobile communication network, an external terminal, and a server. Here, the wireless signal may include a voice call signal, a video telephony call signal, or data of various formats according to an exchange of text/multimedia messages.

The broadcasting receiver 1743 receives a broadcasting signal and/or broadcasting relevant information from the outside via a broadcasting channel. The broadcasting channel may include a satellite channel, a ground-wave channel, etc. According to embodiments, the mobile apparatus 100a may not include the broadcasting receiver 1743.

The memory 1760 may store programs to be processed and controlled by the controller 1710 and may store data that is input/output (for example, a plurality of menus, a plurality of first hierarchical sub-menus corresponding to the plurality of menus, respectively, a plurality of second hierarchical sub-menus corresponding to the plurality of first hierarchical sub-menus, respectively, etc.).

Also, the memory 1760 may store the relevant information.

The memory 1760 may include at least one type of storage medium from among a flash memory type, a hard disk type, a multimedia card micro type, a card-type memory (for example, SD or XD memory), random access memory (RAM), static RAM (SRAM), read-only memory (ROM), electrically erasable programmable ROM (EEPROM), programmable ROM (PROM), magnetic memory, a magnetic disk, and an optical disk. Also, the mobile apparatus 100a may run a web storage or a cloud server performing a storage function of the memory 1760 on the internet.

The method of pushing information via the mobile apparatus and the method of displaying information via the wearable apparatus according to the embodiments may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A mobile apparatus comprising:
   a controller configured to detect a call connection state of the mobile apparatus, and in response to the call connection state indicating that a call is connected, to obtain information related to another party of the call; and
   a communication interface configured to, in response to the information, transmit, to a wearable apparatus, first information from among the information related to the another party of the call and to receive, from the wearable apparatus, a request to transmit second information from among the information to the wearable apparatus, the second information being based on the first information, the second information being related to the another party of the call,
   the communication interface is further configured to transmit, to the wearable apparatus, at least a portion of information displayed on a screen of the mobile apparatus when a distance between the wearable apparatus and the mobile apparatus is smaller than a predetermined distance,
   wherein the wearable apparatus is further configured to, in response to obtaining the first information, change an attribute of the first information to generate second information, and in response to generating the second information, display the second information on the display of the wearable apparatus.

2. The mobile apparatus of claim 1, wherein the information comprises at least one of address book information, pre-stored memo information, schedule information, image information, information uploaded on a social network service (SNS), and information obtained during the call that are related to the another party of the call.

3. The mobile apparatus of claim 2, wherein the controller is further configured to generate a user interface, and to store the information based on a user input via the user interface.

4. The mobile apparatus of claim 2, wherein the controller is further configured to obtain a voice command from a user of the mobile apparatus as the call connection state is detected, and the information comprises information based on the voice command.

5. The mobile apparatus of claim 1,
   wherein the controller is further configured to set a display parameter with respect to the information,
   wherein the communication interface is further configured to transmit the display parameter to the wearable apparatus, and wherein the display parameter comprises at least one of whether to display the information on the wearable apparatus or the mobile apparatus, types of the information, an order in which the information is displayed, and a number of pieces of the information.

6. The mobile apparatus of claim 1, wherein the controller is further configured to obtain information which had been displayed on the mobile apparatus before the call was connected, as the call connection state is detected.

7. The mobile apparatus of claim 1, wherein the controller, according to a user input received from the mobile apparatus, is further configured to control the communication interface to establish a communication link between the mobile apparatus and the wearable apparatus so that the call is connected to the wearable apparatus, and to control the information displayed on the mobile apparatus.

8. The mobile apparatus of claim 1, wherein the controller is further configured to obtain the information related to the another party of the call from an external server.

9. The mobile apparatus of claim 1, wherein the information comprises information uploaded on a social network service (SNS).

10. The mobile apparatus of claim 1,
wherein the first information includes one type of information selected from among the pre-stored memo information, the schedule information, the image information, the information uploaded on a social network service (SNS), and the information obtained during the call that are related to the another party of the call, and
wherein the second information includes another type of information selected from among the pre-stored memo information, the schedule information, the image information, the information uploaded on a social network service (SNS), and the information obtained during the call that are related to the another party of the call, the another type of information being different from the one type of information.

11. A wearable apparatus comprising:
a communication interface configured to receive information related to another party of a call, in response to a call connection state being detected via a mobile apparatus, the information comprising first information and second information, the first information being different from the second information;
a display configured to display the first information;
a user input unit configured to receive a user input from a user of the wearable apparatus; and
a controller configured to change from the first information to the second information based on the user input,
wherein the wearable apparatus is configured to measure a distance between the wearable apparatus and the mobile apparatus,
wherein the wearable apparatus is further configured to obtain at least a portion of information displayed on a screen of the mobile apparatus when the distance is smaller than a predetermined distance,
wherein the wearable apparatus is further configured to, in response to obtaining the first information, change an attribute of the first information to generate second information, and in response to generating the second information, display the second information on the display of the wearable apparatus.

12. The wearable apparatus of claim 11, wherein the information further comprises information obtained from an external server as the call connection state is detected via the mobile apparatus.

13. The wearable apparatus of claim 11, wherein the communication interface is further configured to receive a display parameter with respect to the information, and
the display is further configured to display the information based on the display parameter.

14. The wearable apparatus of claim 11, wherein the controller is further configured to request a transmission of the second information that is based on the first information, based on the user input.

15. The wearable apparatus of claim 14,
wherein the first information includes one type of information selected from among the pre-stored memo information, the schedule information, the image information, the information uploaded on a social network service (SNS), and the information obtained during the call that are related to the another party of the call, and
wherein the second information includes another type of information selected from among the pre-stored memo information, the schedule information, the image information, the information uploaded on a social network service (SNS), and the information obtained during the call that are related to the another party of the call, the another type of information being different from the one type of information.

16. The wearable apparatus of claim 11,
wherein the wearable apparatus further comprises a camera, and
wherein the wearable apparatus is further configured to obtain the first information displayed on a screen of the mobile apparatus by photographing the screen of the mobile apparatus using the camera.

17. A method of transmitting information via a mobile apparatus, the method comprising:
detecting a call connection state of the mobile apparatus;
obtaining, in response to the call connection state indicating that a call is connected, information related to another party of the call; and
transmitting the information to a wearable apparatus,
wherein the transmitting of the information to the wearable apparatus comprises transmitting first information from among the information related to the another party of the call to the wearable apparatus, and
the method further comprises receiving a request from the wearable apparatus to transmit second information from among the information to the wearable apparatus, the second information being based on the first information, the second information being related to the another party of the call,
wherein the method further comprises transmitting, to the wearable apparatus, at least a portion of information displayed on a screen of the mobile apparatus when a distance between the wearable apparatus and the mobile apparatus is smaller than a predetermined distance,
wherein the wearable apparatus is configured to, in response to obtaining the first information, change an attribute of the first information to generate second information, and in response to generating the second information, display the second information on the display of the wearable apparatus.

18. The method of claim 17, wherein the transmitting of the information to the wearable apparatus comprises:
setting a display parameter with respect to the information, and
transmitting the display parameter to the wearable apparatus.

19. The method of claim 17, wherein the transmitting of the information to the wearable apparatus comprises:

generating a user interface, and storing the information based on a user input via the user interface.

20. The method of claim 17, wherein the first information includes one type of information selected from among pre-stored memo information, schedule information, image information, information uploaded on a social network service (SNS), and information obtained during the call that are related to the another party of the call, and wherein the second information includes another type of information selected from among the pre-stored memo information, the schedule information, the image information, the information uploaded on a social network service (SNS), and the information obtained during the call that are related to the another party of the call, the another type of information being different from the one type of information.

21. A wearable apparatus comprising:

a communication interface configured to receive information related to another party of a call, in response to a call connection state being detected via a mobile apparatus, the information comprising first information and second information, the first information being different from the second information;

a display configured to display the first information;

a user input unit configured to receive a user input from a user of the wearable apparatus; and a controller configured to change from the first information to the second information based on the user input, wherein the wearable apparatus is configured to obtain target information, the target information being displayed on a screen of the mobile apparatus, and wherein the wearable apparatus is further configured to, in response to obtaining the target information, display hidden information on the display of the wearable apparatus, the hidden information corresponding to the target information.

* * * * *